Aug. 29, 1933.   R. K. LEE   1,924,504
MOTOR MOUNTING
Filed Feb. 24, 1930

INVENTOR
ROGER K. LEE.
BY
ATTORNEY

Patented Aug. 29, 1933

1,924,504

UNITED STATES PATENT OFFICE

1,924,504
MOTOR MOUNTING

Roger K. Lee, Highland Park, Mich., assignor to Chrysler Corporation, Detroit, Mich., a corporation of Delaware Application February 24, 1930. Serial No. 430,636

4 Claims. (Cl. 248—14.2)

This invention relates to a resilient mounting and more particularly to a mounting adapted to dampen out vibrations between a support and a supporting member, such as an internal combustion engine mounted in the side frame members of a vehicle chassis.

An object of the invention is to provide oppositely spaced members arranged in overlapping relation and having a resilient material between the members. The parts are vulcanized together forming a unit which may be easily assembled or disassembled between the engine and a channel side frame member.

Another object of the invention is to provide a thin resilient mounting having laterally projecting screw threaded members by which the mounting may be secured to a support and to a part to be supported.

Other objects and advantages of the invention will more fully appear from the following description taken in connection with the accompanying drawing, in which.

Figure 1:
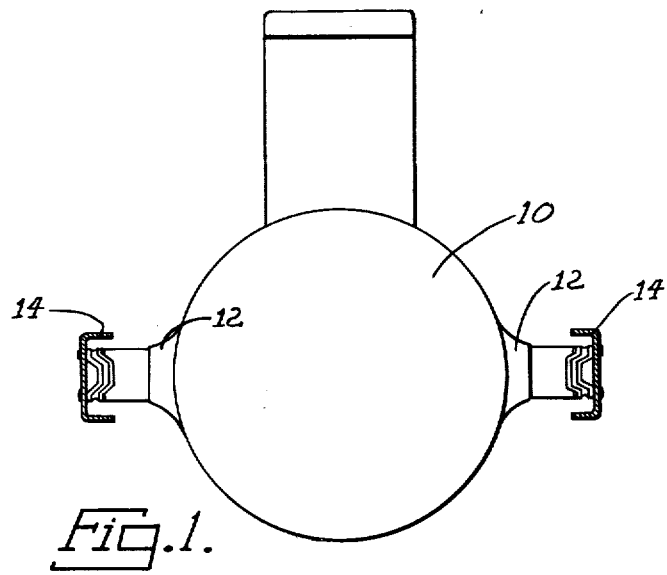
Fig. 1 is an end view of an internal combustion engine supported between the side members of a chassis frame, illustrating a preferred embodiment of my invention, the frame members being shown in section.
Figures 2, 3:
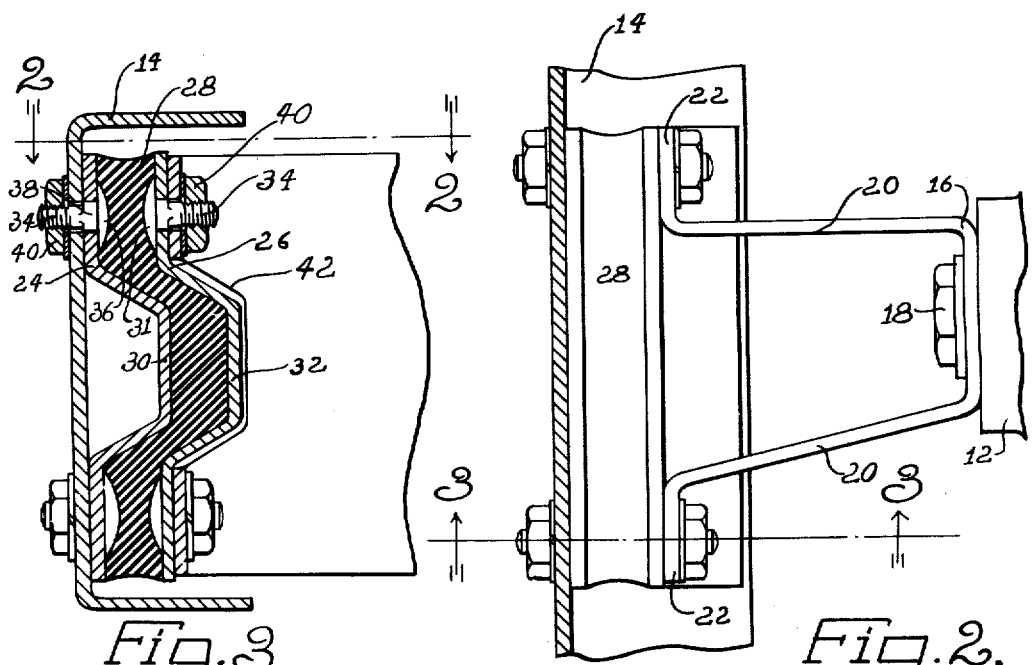
Fig. 2 is an enlarged view taken on line 2—2 of Fig. 3, the mounting being shown in elevation and the frame in section.
Fig. 3 is a sectional view taken on line 3—3 of Fig. 2.

Referring to the drawing, I have shown an internal combustion engine 10 having laterally projecting arms 12. Side frame members 14 have been illustrated as the frame members of an automobile chassis adapted to form a support for the engine 10. A channel shaped member 16 is detachably secured to the motor arm 12 by bolts 18. The side flanges 20 of the channel shaped member 16 have their outer edges bent outwardly forming flanges 22. The flanges are provided with openings for receiving screw threaded members hereinafter more fully referred to.

The mounting, which forms a resilient connection between the channel 16 and the side frame member, is formed from two oppositely spaced members 24 and 26, with a resilient member 28, such as rubber, having its opposite face vulcanized to the adjacent faces of the spaced members 24 and 26. In the form of my invention shown, the spaced members 24 and 26 are each provided with a depressed portion 30 and 32 extending transversely of the members and substantially at the center thereof. The depressed portion 30 extends into the depressed portion 32 forming a zigzag space which is filled with the rubber 28.

As a means for attaching the members 24 and 26, one to a support and the other to a part to be supported, I have arranged bolts 34 extending through openings in the members 24 and 26. The bolts are provided with heads 36 abutting against the inner faces of the members 24 and 26 and embedded in the rubber 28. The shank of the bolts 34, adjacent the heads 36, is formed irregularly, as at 38, and engages an irregular opening to prevent turning of the bolt with respect to the members 24 and 26.

In assembling the mounting between the channel 16 and the frame member 14, the bolts 34 are received in the openings in the respective members and nuts 40 secure the mounting to the members 14 and 16. A portion of the flanges 22 and 20 are cut away, as at 42, to receive the depressed portion 32 of the member 26.

Various changes, including the size, shape and arrangement of parts, may be made without departing from the spirit of my invention and it is my intention to cover by my claims such changes as may be reasonably included within the scope thereof.

I claim:

1. A motor mounting comprising two spaced plate like members, each of said plate like members having two of its opposite edges in a common plane and a central depressed portion, the edges of one of said plate like members being arranged in the plane of the central depressed portion of the other of said plate like members, and rubber between said members vulcanized to the adjacent faces of said members.

2. A mounting comprising two plate like members, each of said plate like members having substantially flat opposite end portions in a common plane, a substantially flat central portion in a plane offset to the plane of the end portions, intermediate diverging portions connecting the end portions to the central portion, said members being similarly arranged and in spaced relation, and rubber between and vulcanized to the adjacent faces of said members, and means for securing one plate-like member to a support and the other plate-like member to a part to be supported, the part to be supported exerting a load in a direction transverse to the offset portion.

3. A mounting comprising two plate like members, each of said plate like members having substantially flat opposite end portions in a common plane, a substantially flat central portion in a plane offset to the plane of the end portions, and intermediate diverging portions connecting the end portions to the central portion, said members being similarly arranged and in spaced relation, the flat opposite end portions of each member having openings, bolts in the openings, the heads of which are between the said members, and rubber between said members overlapping the heads of said bolts and vulcanized to the adjacent faces of said members, said bolts adapted to secure the plates to a support and a part to be supported respectively with the load of the part to the supported in a direction transverse to the offset portion.

4. A mounting comprising two plate like members, each of said plate like members having substantially flat opposite end portions in a common plane, an offset central portion connecting the end portions, said members being similarly arranged and in spaced relation and rubber between and vulcanized to the adjacent faces of said members, and means for securing one plate like member to a support and the other plate like member to a part to be supported, the part to be supported exerting a load in a direction transverse to the offset portion.

ROGER K. LEE.

CERTIFICATE OF CORRECTION

Patent No. 1,924,504.      August 29, 1933.

ROGER K. LEE.

It is hereby certified that error appears in the printed specification of the above numbered patent requiring correction as follows: Page 2, line 12, claim 3, for "the" third occurrence read be; and that the said Letters Patent should be read with this correction therein that the same may conform to the record of the case in the Patent Office.

Signed and sealed this 20th day of February, A. D. 1934.

(Seal)

F. M. Hopkins
Acting Commissioner of Patents.

plane offset to the plane of the end portions, and intermediate diverging portions connecting the end portions to the central portion, said members being similarly arranged and in spaced relation, the flat opposite end portions of each member having openings, bolts in the openings, the heads of which are between the said members, and rubber between said members overlapping the heads of said bolts and vulcanized to the adjacent faces of said members, said bolts adapted to secure the plates to a support and a part to be supported respectively with the load of the part to the supported in a direction transverse to the offset portion.

4. A mounting comprising two plate like members, each of said plate like members having substantially flat opposite end portions in a common plane, an offset central portion connecting the end portions, said members being similarly arranged and in spaced relation and rubber between and vulcanized to the adjacent faces of said members, and means for securing one plate like member to a support and the other plate like member to a part to be supported, the part to be supported exerting a load in a direction transverse to the offset portion.

ROGER K. LEE.

CERTIFICATE OF CORRECTION

Patent No. 1,924,504.　　　　　　　　　　　　August 29, 1933.

ROGER K. LEE.

It is hereby certified that error appears in the printed specification of the above numbered patent requiring correction as follows: Page 2, line 12, claim 3, for "the" third occurrence read be; and that the said Letters Patent should be read with this correction therein that the same may conform to the record of the case in the Patent Office.

Signed and sealed this 20th day of February, A. D. 1934.

F. M. Hopkins
Acting Commissioner of Patents.

(Seal)

CERTIFICATE OF CORRECTION

Patent No. 1,924,504.                                              August 29, 1933.

ROGER K. LEE.

It is hereby certified that error appears in the printed specification of the above numbered patent requiring correction as follows: Page 2, line 12, claim 3, for "the" third occurrence read be; and that the said Letters Patent should be read with this correction therein that the same may conform to the record of the case in the Patent Office.

Signed and sealed this 20th day of February, A. D. 1934.

F. M. Hopkins (Seal)                                         Acting Commissioner of Patents.